(12) United States Patent
Kennedy

(10) Patent No.: US 10,618,446 B2
(45) Date of Patent: Apr. 14, 2020

(54) STACKABLE HORIZONTAL MAST ASSEMBLY

(71) Applicant: Gino Kennedy, Jacksonville, FL (US)

(72) Inventor: Gino Kennedy, Jacksonville, FL (US)

(*) Notice: Subject to any disclaimer, the term of this patent is extended or adjusted under 35 U.S.C. 154(b) by 215 days.

(21) Appl. No.: 15/815,153

(22) Filed: Nov. 16, 2017

(65) Prior Publication Data

US 2018/0201175 A1 Jul. 19, 2018

Related U.S. Application Data

(63) Continuation-in-part of application No. 14/732,128, filed on Jun. 5, 2015, now Pat. No. 9,897,268.

(60) Provisional application No. 62/145,002, filed on Apr. 9, 2015, provisional application No. 62/008,848, filed on Jun. 6, 2014.

(51) Int. Cl.
| | |
|---|---|
| *F21S 9/00* | (2006.01) |
| *B60P 3/18* | (2006.01) |
| *B62D 63/06* | (2006.01) |
| *B60D 1/145* | (2006.01) |
| *B60S 9/02* | (2006.01) |
| *E04H 12/34* | (2006.01) |
| *E04H 12/18* | (2006.01) |
| *F21V 21/14* | (2006.01) |
| *F21L 13/00* | (2006.01) |
| *F21L 4/08* | (2006.01) |
| *E04H 12/22* | (2006.01) |

(52) U.S. Cl.
CPC ............... *B60P 3/18* (2013.01); *B60D 1/145* (2013.01); *B60S 9/02* (2013.01); *B62D 63/062* (2013.01); *E04H 12/182* (2013.01); *E04H 12/187* (2013.01); *E04H 12/22* (2013.01); *E04H 12/345* (2013.01); *F21L 4/08* (2013.01); *F21L 13/00* (2013.01); *F21V 21/14* (2013.01)

(58) Field of Classification Search
CPC ....... B60P 3/18; B60P 3/06; F21L 4/08; F21L 13/00; F21V 21/14; B60S 9/02; B62D 63/08; B62D 63/062; E60D 2001/008; E04H 17/22; E04H 12/187; E04H 12/182; E04H 12/345; B60D 1/145
See application file for complete search history.

(56) References Cited

U.S. PATENT DOCUMENTS

| | | |
|---|---|---|
| 3,439,467 A | 4/1969 | Partlow |
| 3,495,364 A | 2/1970 | De Bella |
| 4,181,929 A | 1/1980 | Barber et al. |
| 5,765,805 A | 6/1998 | Kennedy |
| 5,806,963 A | 9/1998 | Miller et al. |

(Continued)

*Primary Examiner* — Y M. Lee
(74) *Attorney, Agent, or Firm* — McHale & Slavin, P.A.

(57) ABSTRACT

A stackable enclosure for support of a mast stored in horizontal position and rotatable to a vertically deployed position. The enclosure employs a housing have sidewalls constructed and arranged to support a plurality of stacked enclosures. The dimensions of the enclosure with wheels can allow for the transporting of thirty units on a single 48 drop deck trailer. The enclosure has a hinged lid to allow ease of access to the interior which can house a power system to operate a bank of lights. Outriggers positioned along each corner of the enclosure provide stability to the mast in high winds. A hinged axle can be used to pivot enclosure wheels upward, allowing the enclosure to rest flush on a trailer deck or ground surface.

25 Claims, 21 Drawing Sheets

(56) References Cited

U.S. PATENT DOCUMENTS

| | | | |
|---|---|---|---|
| 6,047,942 | A | 4/2000 | Kennedy |
| 6,517,225 | B1 | 2/2003 | Allen et al. |
| 6,805,462 | B1 | 10/2004 | Smith et al. |
| 7,309,927 | B2 | 12/2007 | Sugiyama et al. |
| 7,432,606 | B2 | 10/2008 | Yamamoto et al. |
| 7,621,650 | B2 | 11/2009 | Nalitchaev et al. |
| 7,667,963 | B2 | 2/2010 | Illerhaus et al. |
| 7,768,799 | B2 | 8/2010 | Cramer et al. |
| D668,224 | S | 10/2012 | Trine et al. |
| 8,303,143 | B2 | 11/2012 | Webb |
| 8,391,012 | B2 | 3/2013 | Trine et al. |
| 8,439,534 | B1 | 5/2013 | Roe et al. |
| 8,616,159 | B1 | 12/2013 | Hawkins |
| 8,950,530 | B2 | 2/2015 | Niedzwiecki |
| 9,316,408 | B2 | 4/2016 | Justus |
| 2006/0157988 | A1 | 7/2006 | Mazuka et al. |
| 2010/0253025 | A1 | 10/2010 | Smith |
| 2012/0006369 | A1* | 1/2012 | Cantin ................ E04B 1/34305 135/96 |
| 2012/0201016 | A1* | 8/2012 | Robertson ............... F21V 21/26 362/183 |
| 2013/0133271 | A1 | 5/2013 | Niedzwiecki |
| 2015/0023017 | A1* | 1/2015 | Smith .................... F21V 21/22 362/249.03 |
| 2015/0059662 | A1 | 3/2015 | Lan et al. |
| 2015/0280489 | A1 | 10/2015 | Curlett |
| 2016/0033095 | A1 | 2/2016 | Kennedy |
| 2017/0141721 | A1 | 5/2017 | Schmidt |

\* cited by examiner

ISOMETRIC

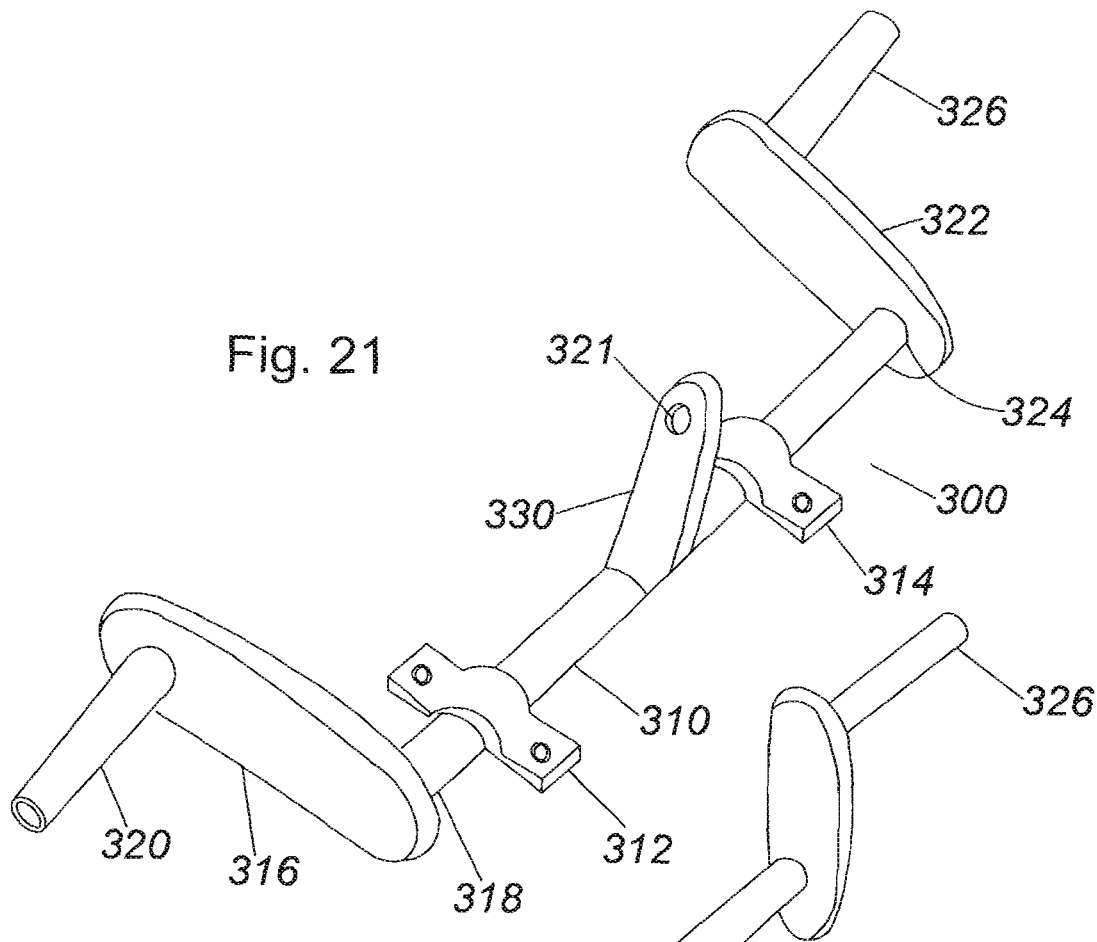
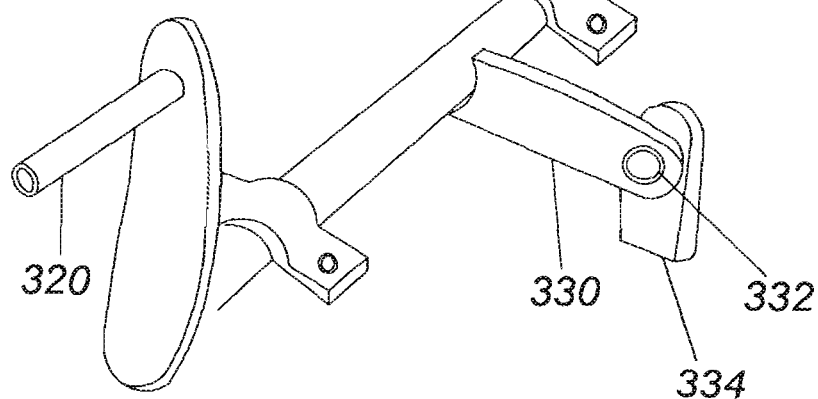

STACKABLE HORIZONTAL MAST ASSEMBLY

CROSS REFERENCE TO RELATED APPLICATIONS

In accordance with 37 C.F.R. 1.76, a claim of priority is included in an Application Data Sheet filed concurrently herewith. Accordingly, the present application is a Continuation-in-Part of U.S. patent application Ser. No. 14/732,128 entitled "Stackable Tower Trailer", filed Jun. 5, 2015, which claimed priority to U.S. Provisional Patent Application No. 62/145,002, entitled "Stackable Tower Trailer", filed Apr. 9, 2015, and U.S. Provisional Patent Application No. 62/008,848, entitled "Stackable Light Plant", filed Jun. 6, 2014. The contents of each of the above referenced applications are incorporated herein by reference.

FIELD OF THE INVENTION

The instant invention relates to portable enclosures and, more specifically, to a stackable enclosure with a horizontal mast.

BACKGROUND OF THE INVENTION

Portable towers use masts to temporarily position lights, speakers, signs or the like in a raised position. For example, portable towers can be used to provide enhanced communication by extending the height of an antenna. Another common use of portable towers is to place a bank of lights in an elevated position for illumination of sporting and music events, road construction projects, emergency and disaster relief situations, carnivals, and most any other activity where portable lighting is needed.

Portable light towers employ a telescoping mast which extends upwardly from a base to support a bank of lights. As the area is typically devoid of electrical power, the portable light towers may be temporarily connected to a power source or have their own source of power, such as rechargeable batteries or an engine/generator power system. The towers can be mounted on trailers having an axle and wheels for ease in transporting. Prior art disclosures include portable lighting systems, exemplified in U.S. Pat. Nos. 3,439,467; 3,495,364; 4,181,929; 5,806,963; 6,517,225; 6,805,462; 7,621,650; 8,303,143; and 8,439,534.

Light towers that do not include wheels need to be transported to remote locations by placement on a trailer. For instance, if a carnival needs five light towers, then either five trailers are needed or a flatbed trailer must be used to carry multiple light towers. If the light towers include wheels, five vehicles and the associated personnel will be needed to transport the light towers. Placing multiple light tower enclosures on a single large flat bed trailer limits the amount of enclosures transported to the length and width of the flatbed.

Presently, conventional light towers lack compact features, which can affect shipping as well as storage. All known prior art light towers lack provisions for nesting and stacking. What is needed in the industry is a stackable enclosure with horizontally storable masts constructed and arranged to allow multiple enclosures to be stacked and nested on a flatbed, thereby providing benefits in both shipping and storage.

SUMMARY OF THE INVENTION

A stackable enclosure with a storable horizontal mast constructed and arranged to allow stacking and nesting of like enclosures. The stackable enclosure having a mast that is stored in a horizontal position and pivoted into a vertical deployed position. The enclosure may house a power system such as an engine/generator combination or a rechargeable battery bank. The distal end of the mast may hold speakers, surveillance cameras, lights or the like.

In a preferred embodiment, a bank of lights is placed on a distal end of the mast which can then be pivoted from a horizontal storage position to a vertical deployment position. The mast is telescoping to extend the height of the bank of lamps. Unique to the instant invention is the enclosure which is designed to allow stacking and nesting. The enclosure employs fork lift guide rails placed along an upper portion of the enclosure. By construction of an enclosure specific for stacking, three like enclosures can be stacked on a flat bed and remain beneath the DOT required bridge clearances. The stacking allows a truck with a 10 ft flatbed to carry six enclosures, wherein three enclosures are stacked in two rows.

The enclosure of the instant invention may include a retractable trailer hitch which allows a reduced length for horizontal nesting. A hinged axle can be further used to reduce storage height. In this embodiment, the instant invention allows for the stacking and nesting of 30 enclosures with wheels on a single 48 ft. drop deck flatbed trailer. Alternatively, a removable straight or torsion axle may be employed.

Accordingly, it is an objective of the instant invention to provide a portable enclosure that is economical to manufacture, maintenance free, safe, efficient and easy to operate and transport. The enclosure allows a mast to be stored on top of and adjacent to similar sized enclosures using minimum real estate, providing a benefit of storage and shipping.

Yet another objective of the instant invention is to provide a portable enclosure with a stored horizontally disposed mast having fork lift through holes placed along an upper portion of the enclosure for ease of movement.

It is another objective of the instant invention to provide a portable enclosure that can include an axle and tow bar yet fit thirty like enclosures on a single 48 ft. flat bed without exceeding 12.7 ft. in height when the bottom enclosure axle is deployed or 11.7 ft. when a bottom enclosure axle is disengaged and the tow bar retracted.

Still another objective of the instant invention is to provide a stackable enclosure with a storable horizontal mast including a generator bolted to an engine to eliminate the weight of a conventional bed plate.

Still another objective of the instant invention is to provide stackable enclosures that allow servicing through side access panels.

Another objective of the invention is to provide a one-piece hinged lid that covers the entire enclosure to allow ease of access to the power system from above.

Still another objective of the instant invention is to provide a stackable enclosure with retractable outriggers for stabilizing in high winds or soft soil.

Yet still another objective of the invention is to provide a sealed enclosure to provide secondary containment of a fuel tank.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 21 is a perspective view of a torsion bar rotatable axle in a lowered position;
and
FIG. 22 is a perspective view of the torsion bar in a raised position.

DETAILED DESCRIPTION OF THE INVENTION

Figure 1:
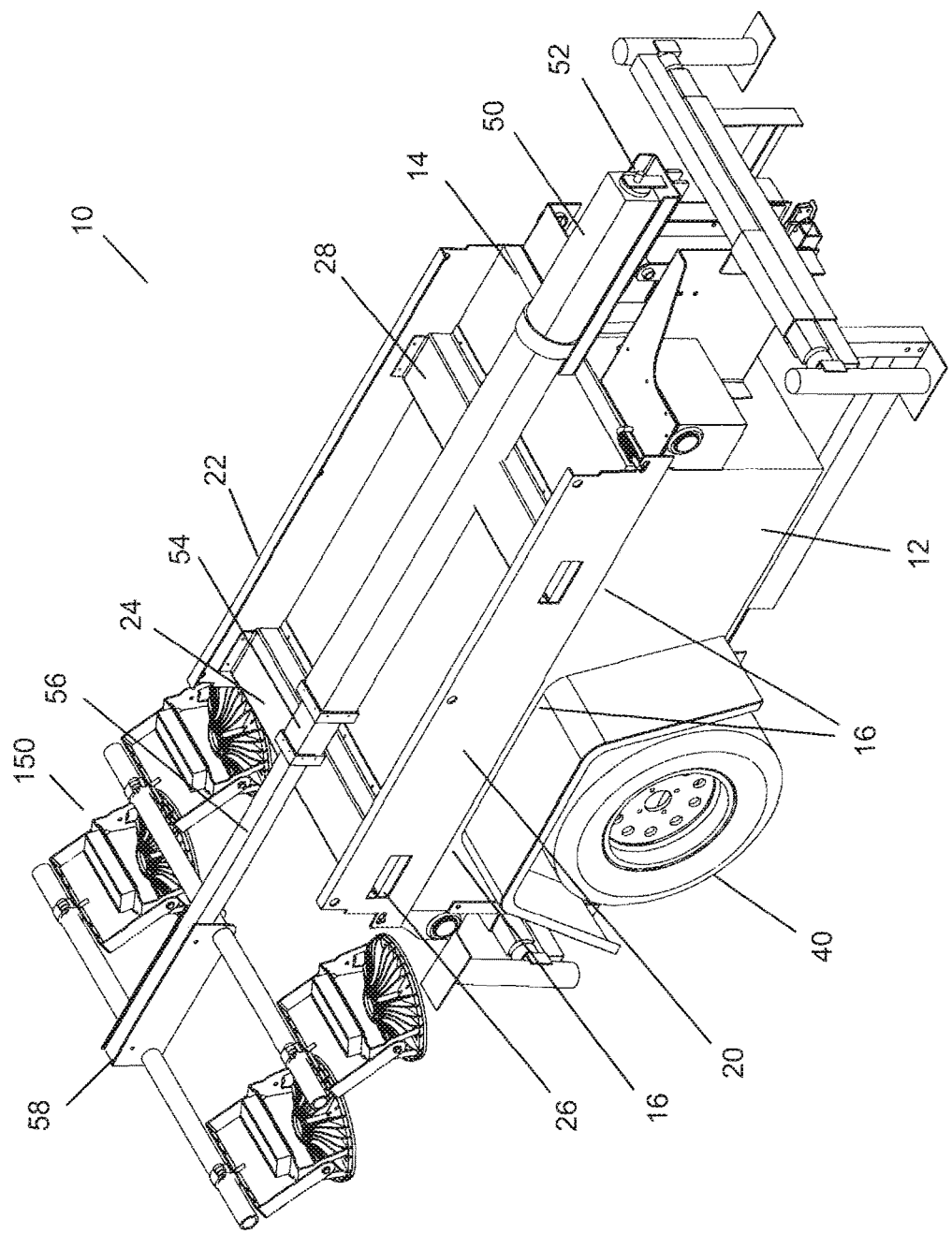
FIG. 1 is a perspective view of a stackable enclosure in a storage position.
Figure 2:
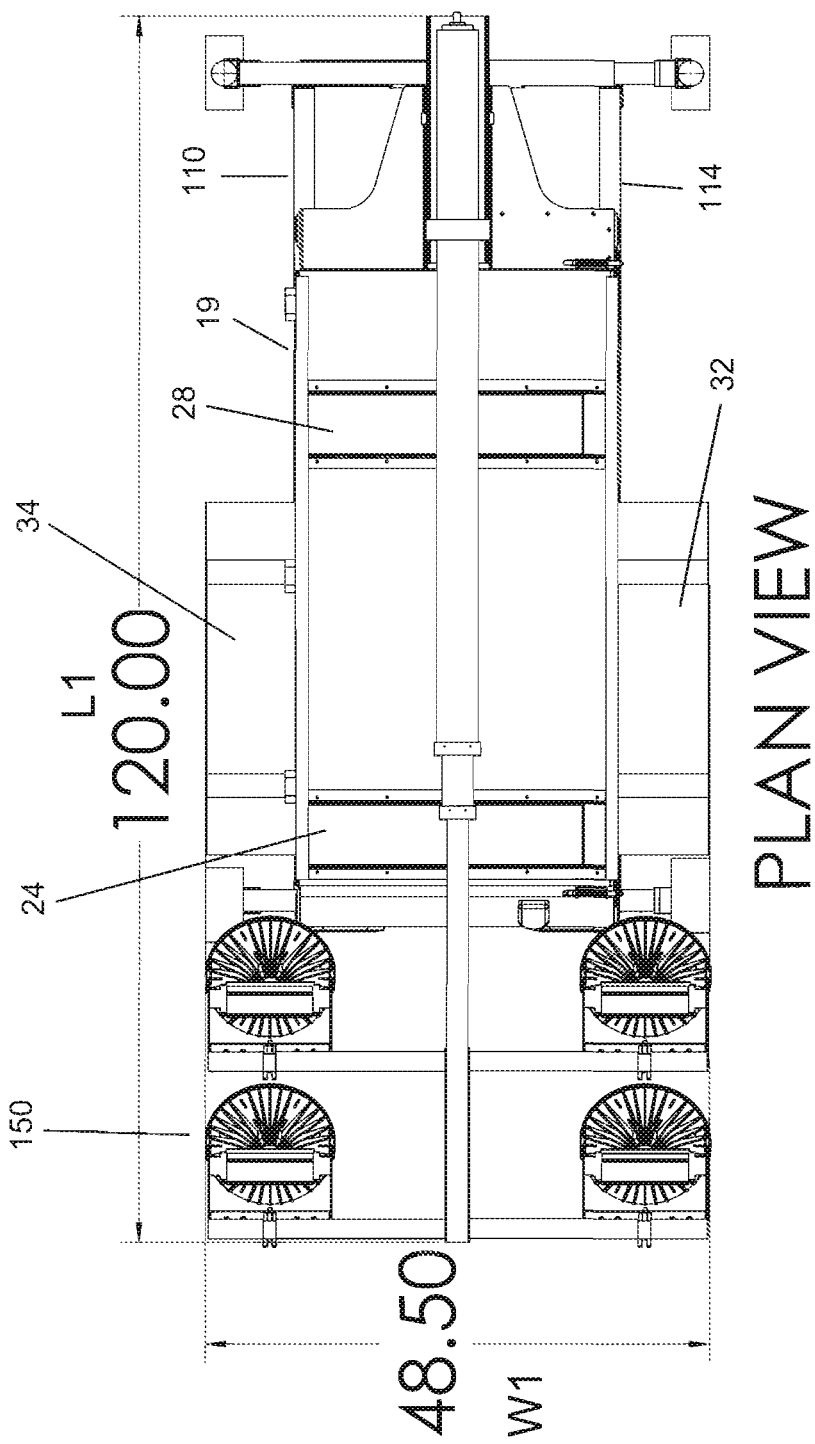
FIG. 2 is a top view thereof.
Figure 3:
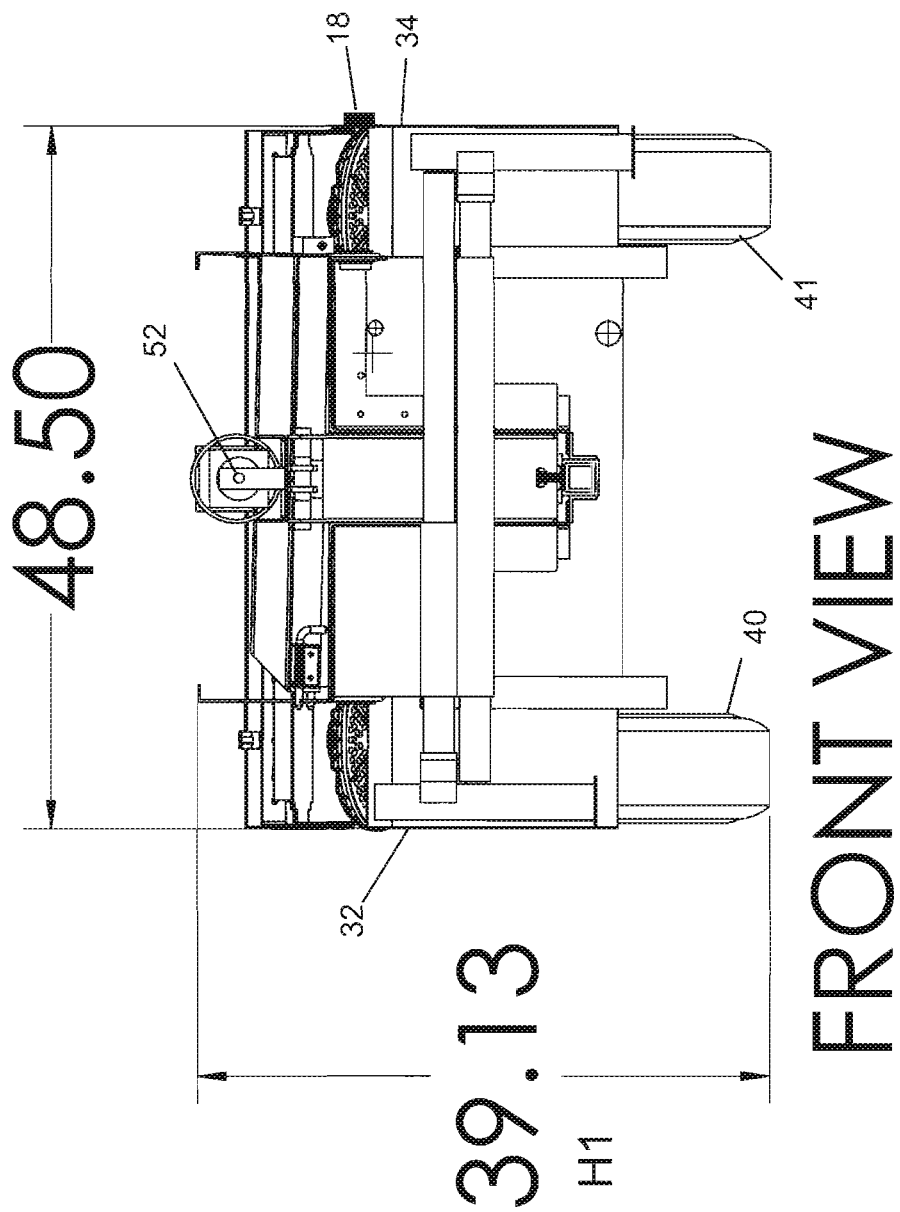
FIG. 3 is a front view thereof.
Figure 4:
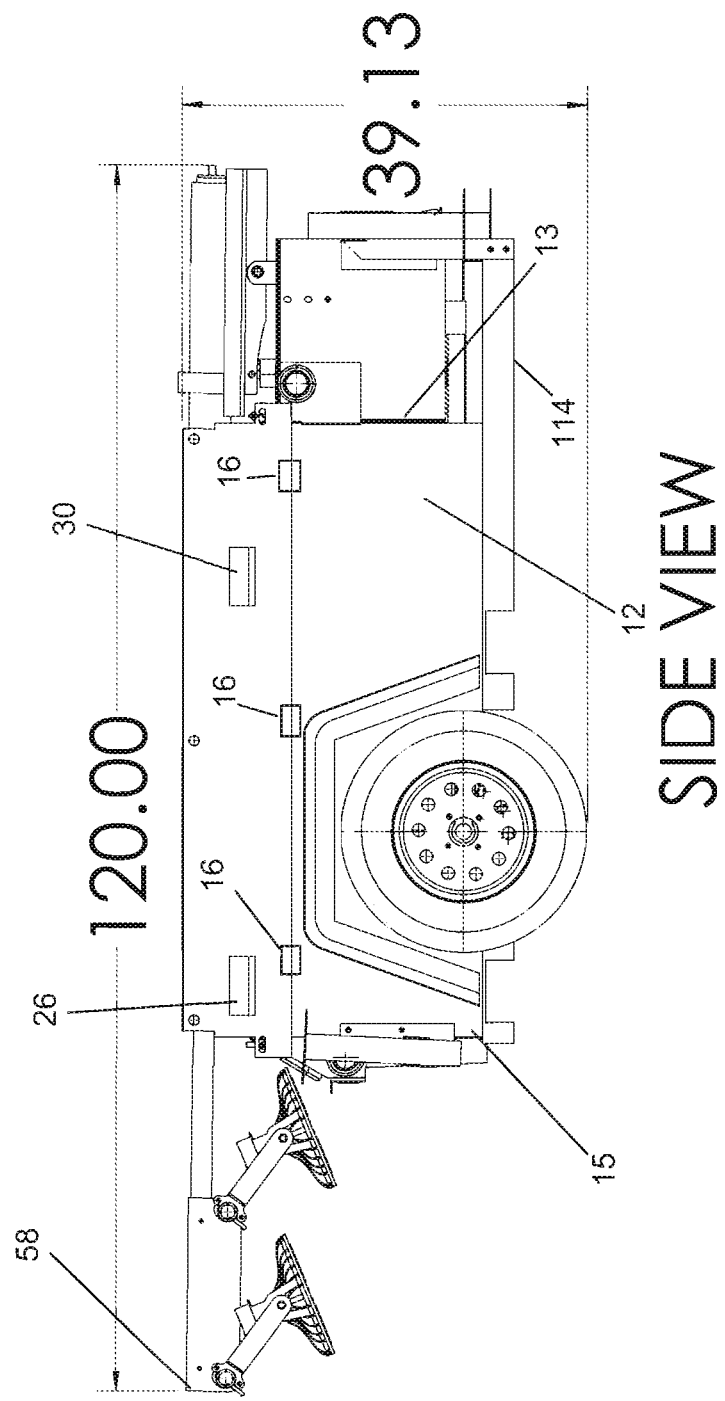
FIG. 4 is a side view thereof.
Figure 5:
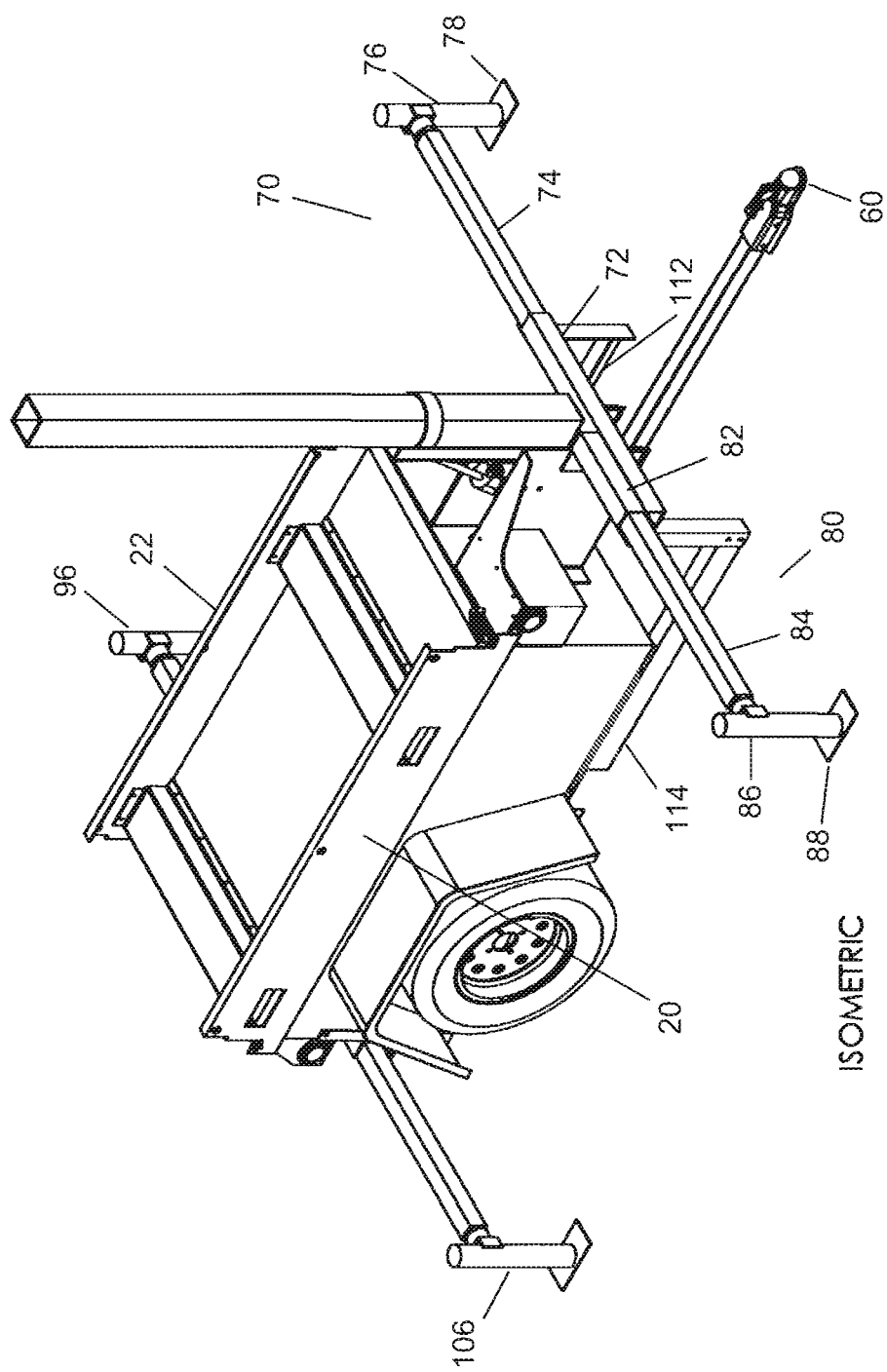
FIG. 5 is a perspective view of the stackable enclosure in a deployed position.
Figure 6:
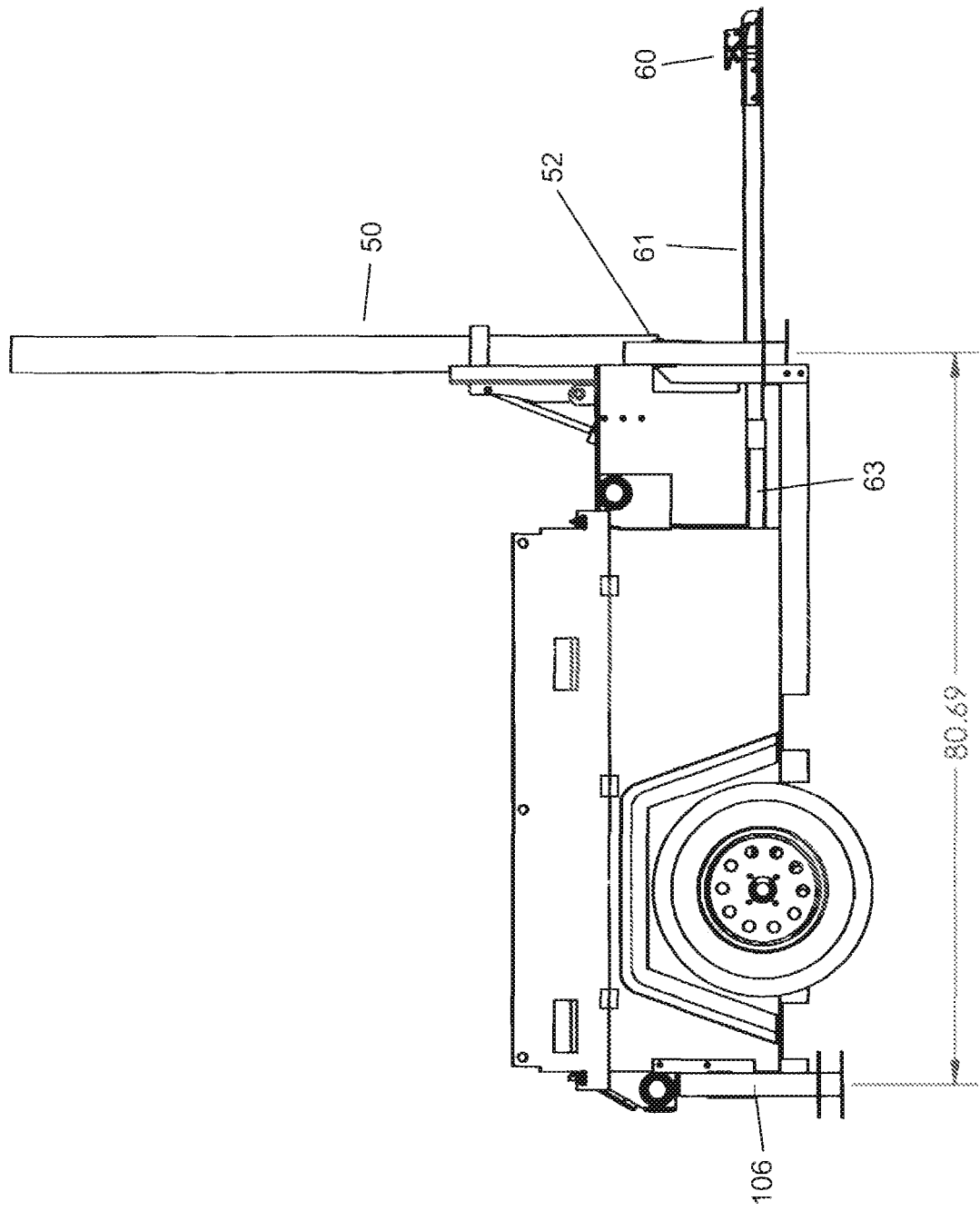
FIG. 6 is a side view thereof.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring now to FIGS. 1-4, illustrated is a stackable enclosure 10 which allows for stacking or nesting of multiple enclosures. The stackable enclosure 10 is comprised of a housing 12 having a lid 14 pivotally connected thereto by hinges 16 and held in a closed position by a latch 18. When unlatched, the lid 14 opens to reveal full and inhibited access to the interior of the enclosure. The enclosure is formed from a front end wall 13 and a rear end wall 15 bounded by a right sidewall 17 and a left sidewall 19. The lid 14 includes a first sidewall 20 hinged to the right sidewall 17, and a second sidewall 22 positioned above the left sidewall. A first fork arm channel 24 connects the first sidewall 20 and the second sidewall 22 with a through hole opening 26. A second fork arm channel 28 connects the first sidewall 20 and the second sidewall 22 with through hole opening 30. The through hole openings 26, 30 are constructed and arranged to receive the arms of a fork lift from either the left or right side of the enclosure. Positioning of the through hole openings 26, 30 above the wheel covers 32, 34 provides an unrestricted view for a forklift driver. Conventional placement of fork lifting points would be below the frame, which makes the wheels an obstacle to the fork lift driver. In a power system embodiment, a fuel tank is strategically mounted over the wheels 40 and 41 to allow for a balanced load despite the fuel weight. In addition, the wheels 40, 41 are centrally disposed between the through holes 26, 30, thereby assuring fork lifting is at the most optimum position.

The first fork arm channel 24 and the second fork arm channel 28 provide support for the expandable mast 50, which is pivotally connected at a proximal end 52 to the enclosure 10. The mast is extendable; either by hydraulics or a screw drive, with first and second extensions 54, 56 expanding the deployed length nearly three times the storage length. The distal end 58 of the mast 50 is used to secure lighting elements, speakers, cameras or the like items.

In a storage position, the enclosure mounted on wheels has a height H1 of about 39 inches, a width W2 of about 48.50 inches, and a length L1 of about 120 inches. The enclosure includes a trailer hitch 60 consisting of a tongue 61 which is slidable within a receiving tube 63. As previously stated, the enclosure is balanced with the only varying weight being that of the fuel level. For this reason, the loading of the enclosure is balanced over the wheels allowing the use of a cantilever trailer hitch 60.

Referring now to FIGS. 5-8, illustrated is the stackable enclosure 10 with a trailer hitch 60 set in an extended position, having the tongue 61 supported by receptacle 63. Mast 50 is depicted in a deployed position, having been rotated from a horizontal position to a vertical position. Front left outrigger 70 is secured to the enclosure 10 by a base sized for receipt of front left extension tube 74. An adjustable front left leg 76 preferably operates like a boat trailer jack, wherein the leg 76 is rotated from a horizontal position to a vertical position and then ratcheted into position engaging the foot 78 on the ground outward from the side of the enclosure 10. Front right outrigger 80 is secured to the housing 12 by a base 82 sized for receipt of front right extension tube 84. An adjustable front right leg 86 is rotated from a horizontal position to a vertical position and then ratcheted for engaging the foot 88 on the ground outward from the side of the enclosure 10. Similarly, rear left outrigger 90 is secured to the enclosure 10 by a base 92 sized for receipt of rear left extension tube 94 with an adjustable rear left leg 96 for positioning of foot 98, and rear right outrigger 100 is secured to the housing 12 by a base 102 sized for receipt of rear right extension tube 104 with an adjustable rear right leg 106 rotatable from a horizontal position to a vertical position for positioning the foot 108 on the ground outward from the side of the enclosure 10. In a deployed position, the outriggers 70, 80, 90, 100 extend the width W1 of the enclosure to width W2 of about 93.5 inches. The mast 50 is raised from the horizontally disposed storage position to the vertical position by an electromechanical piston ram 51.

Figure 7:
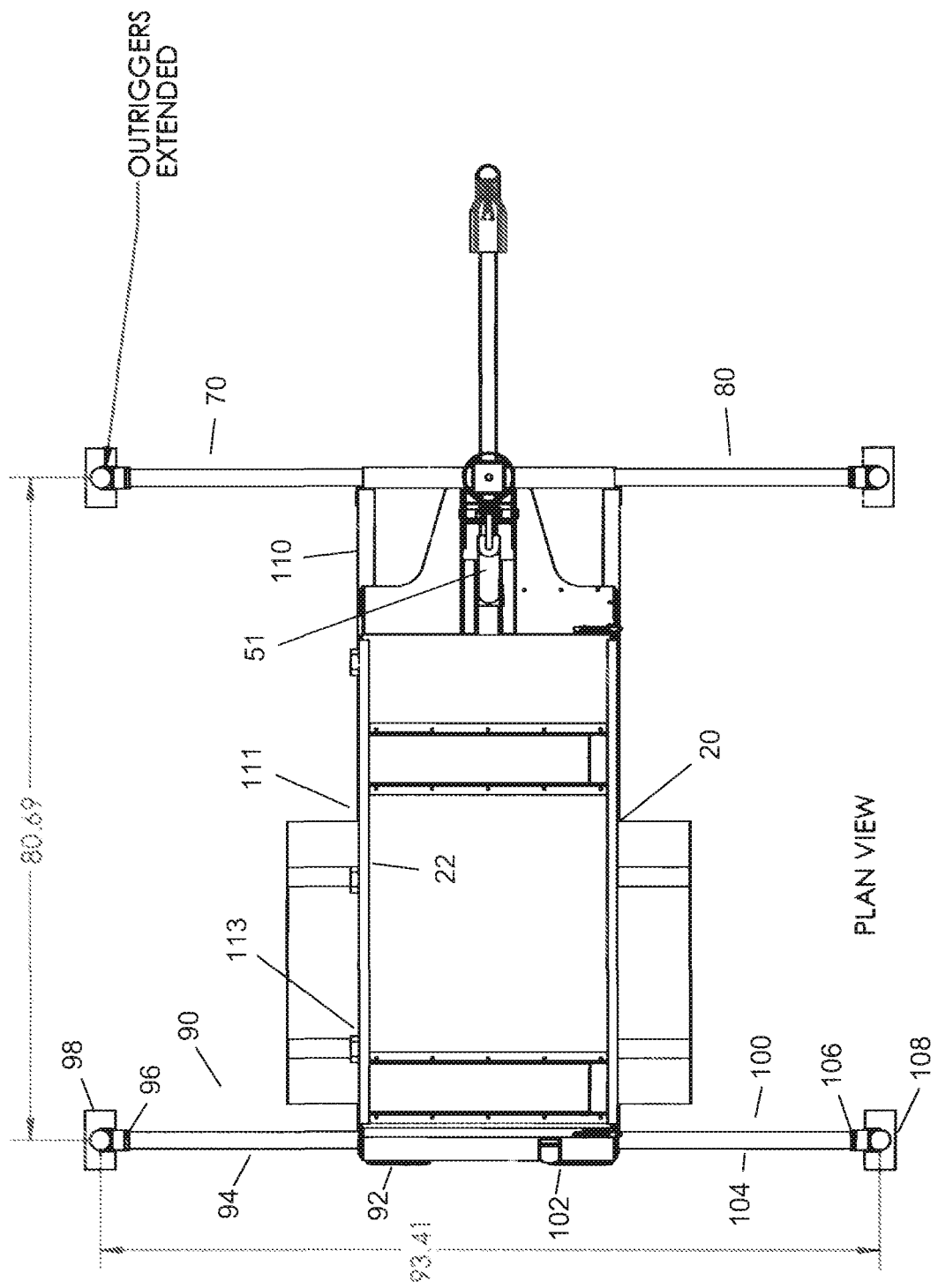
FIG. 7 is a top view thereof.
Figure 8:
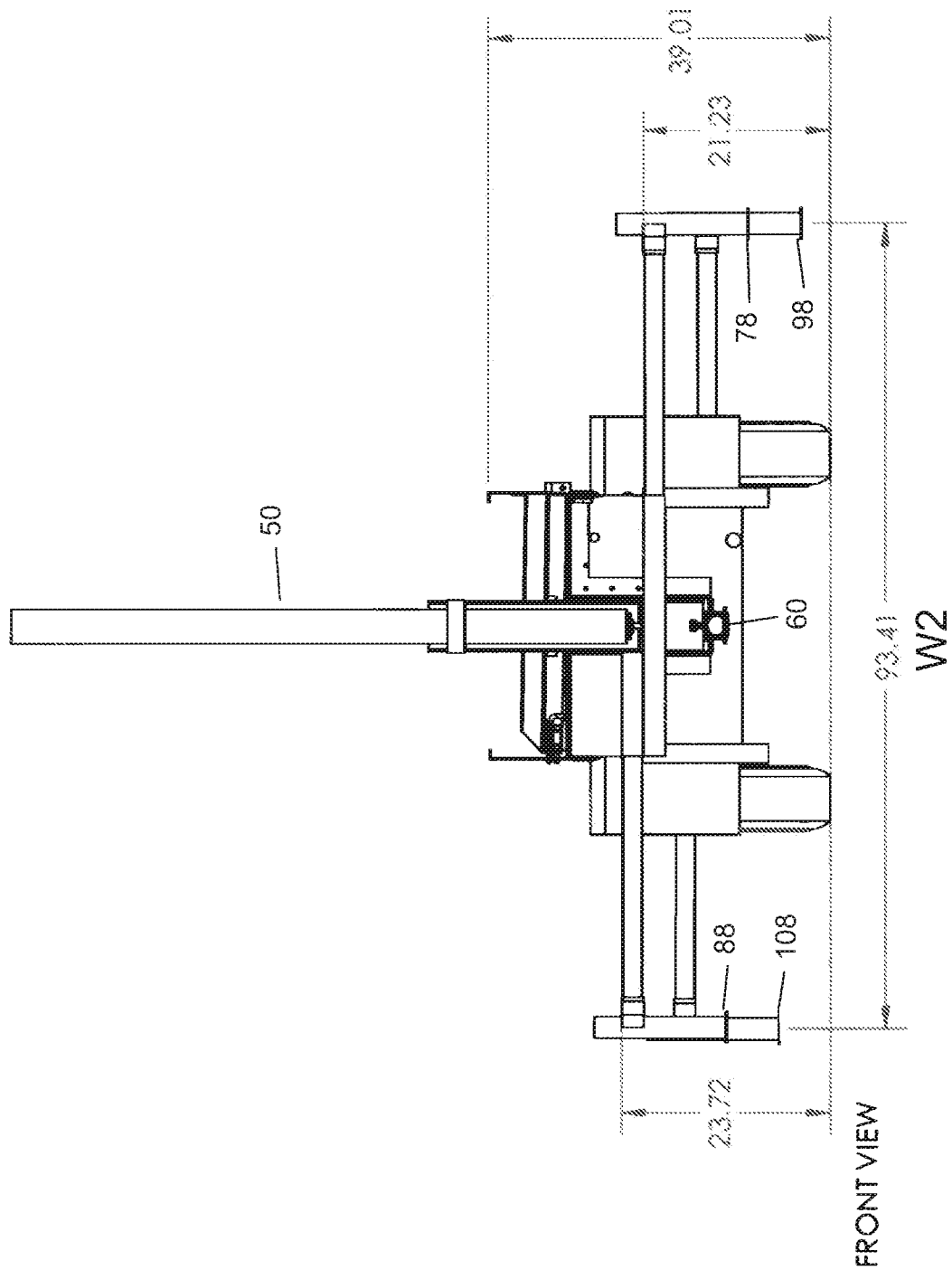
FIG. 8 is a front view thereof.
Figure 9:
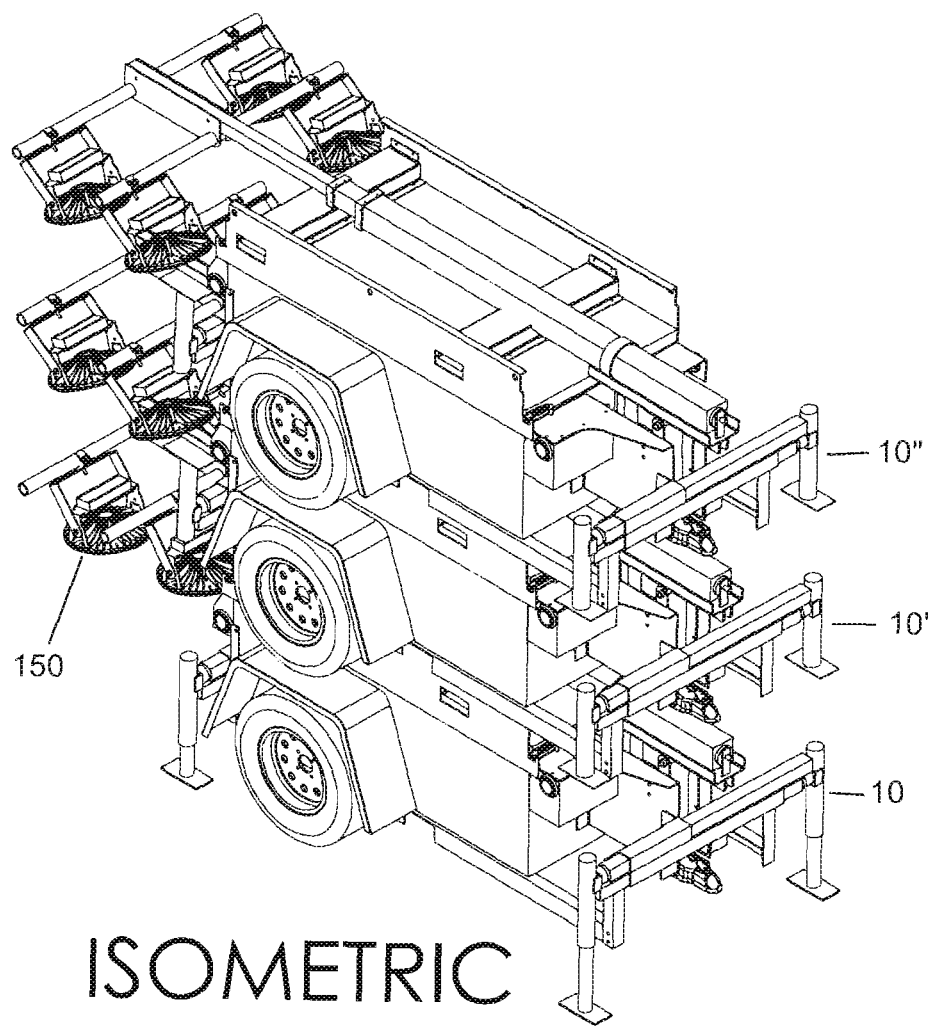
FIG. 9 is a perspective view of three enclosures with wheels and tow bar in a stacked position.
Figure 10:
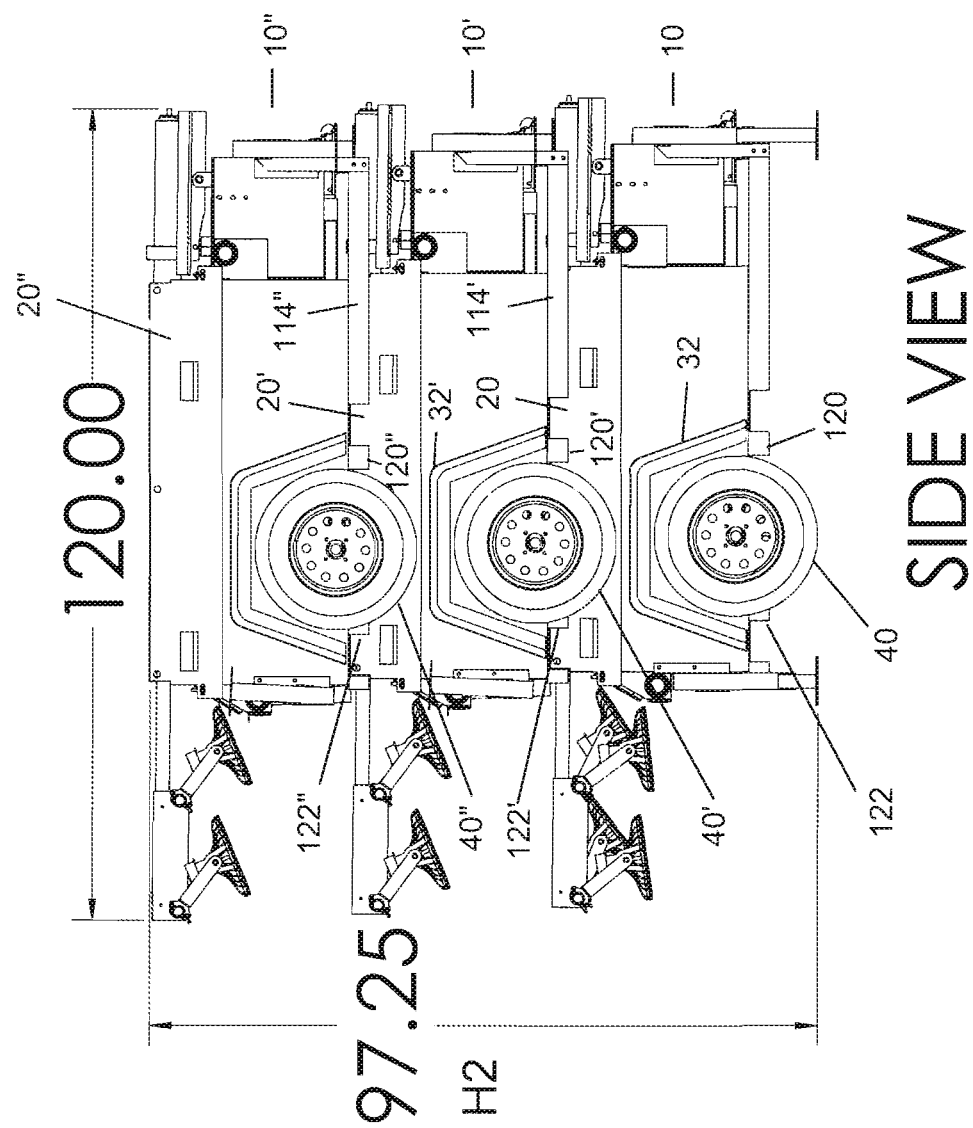
FIG. 10 is a side view thereof.
Figure 11:
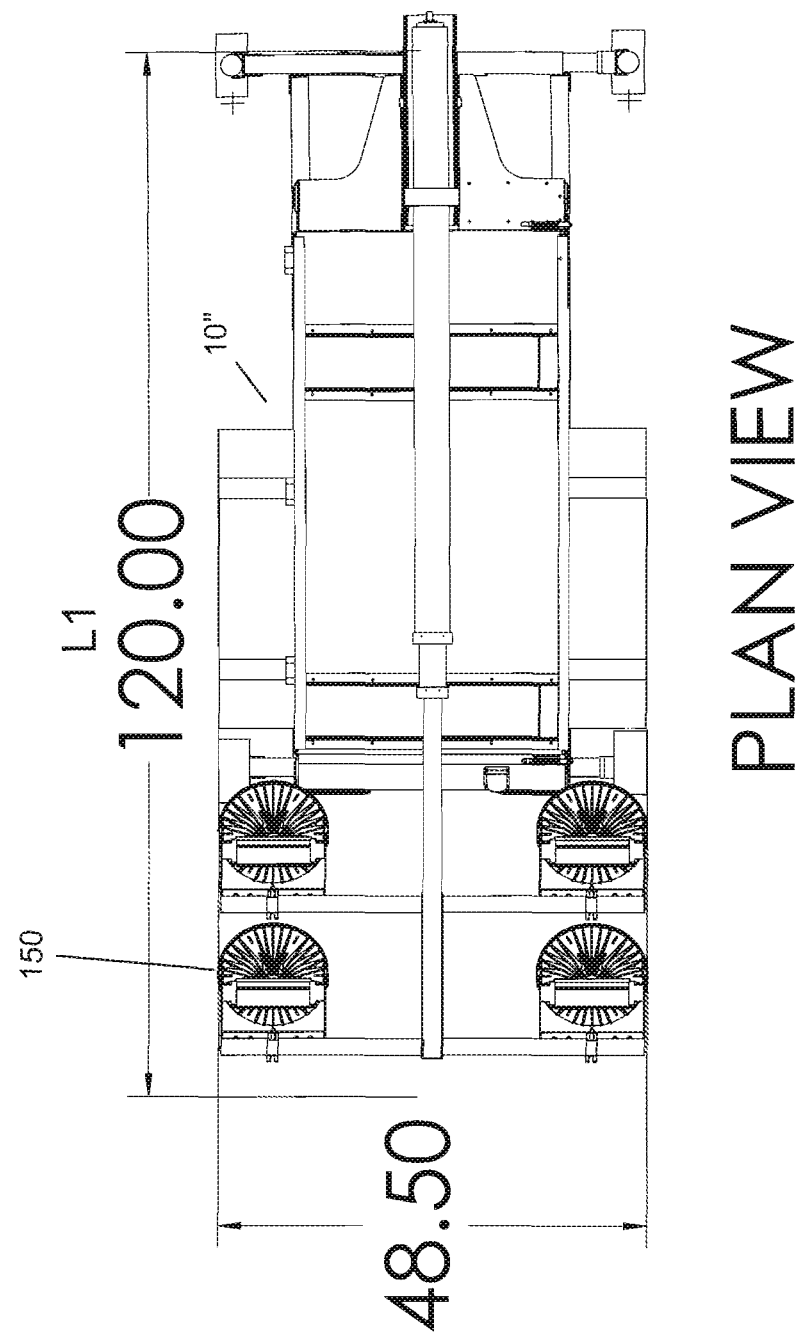
FIG. 11 is a top view thereof.
Figure 12:
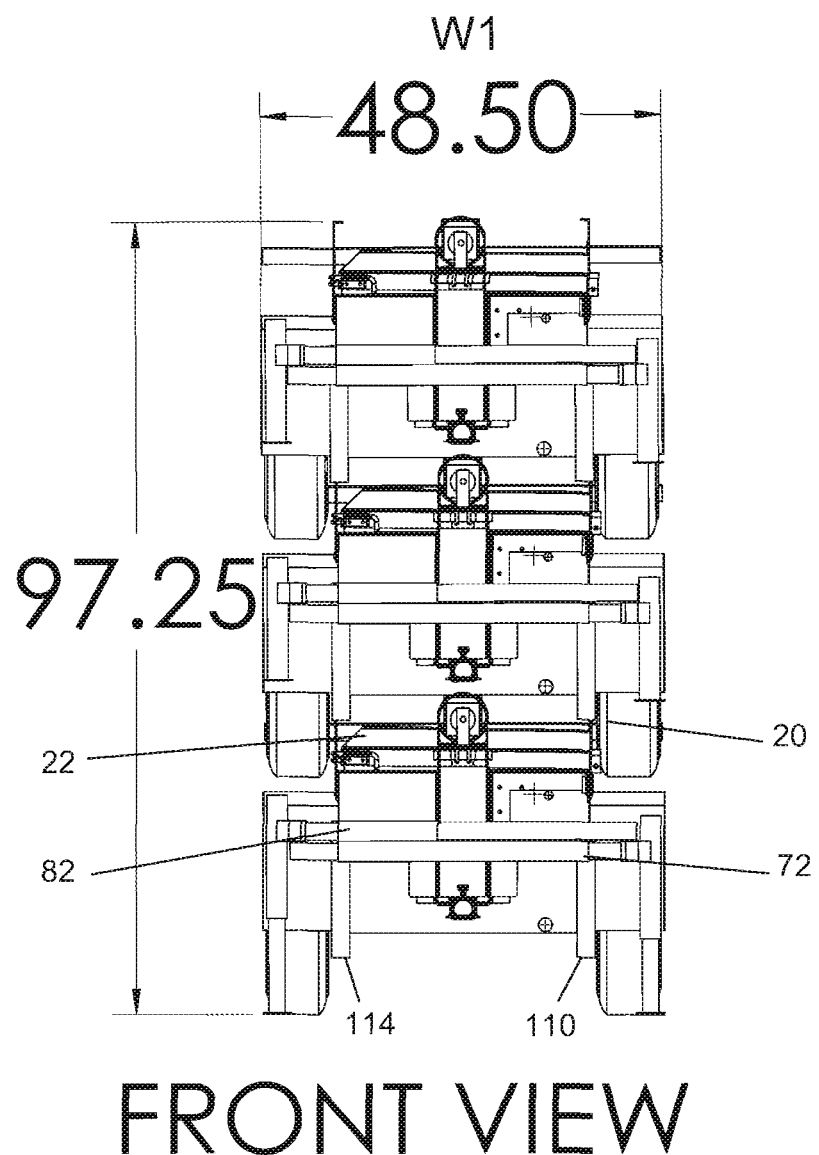
FIG. 12 is a front view thereof.
Figure 13:
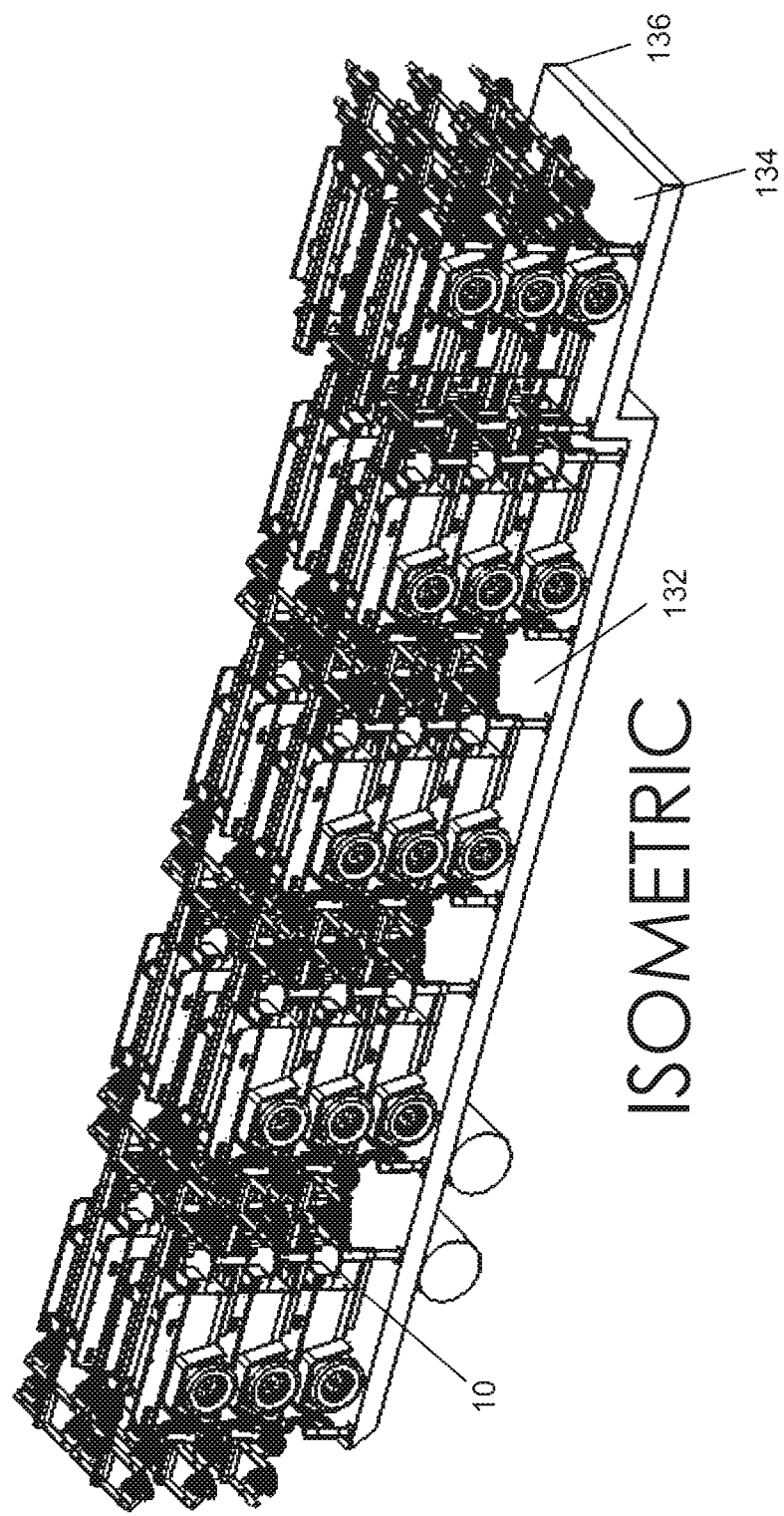
FIG. 13 is a perspective view of a 48 ft. trailer bed with 30 enclosures in a stacked and nested arrangement.
Figure 14:
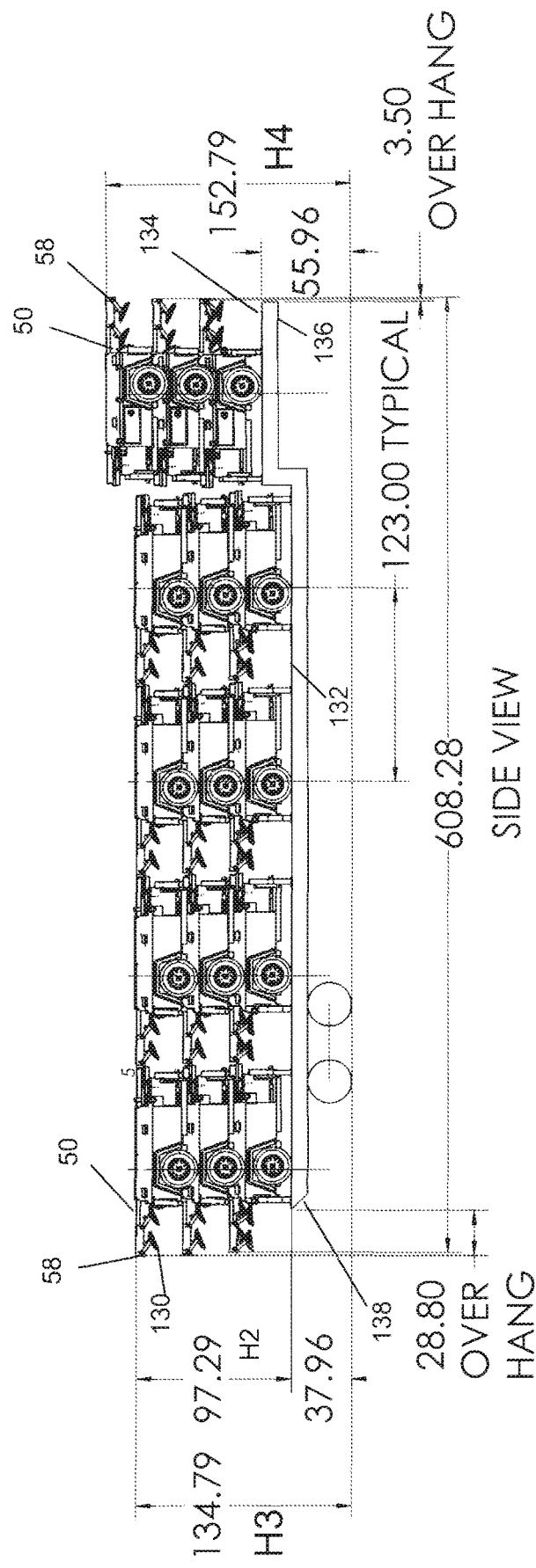
FIG. 14 is a side view thereof.
Figure 15:
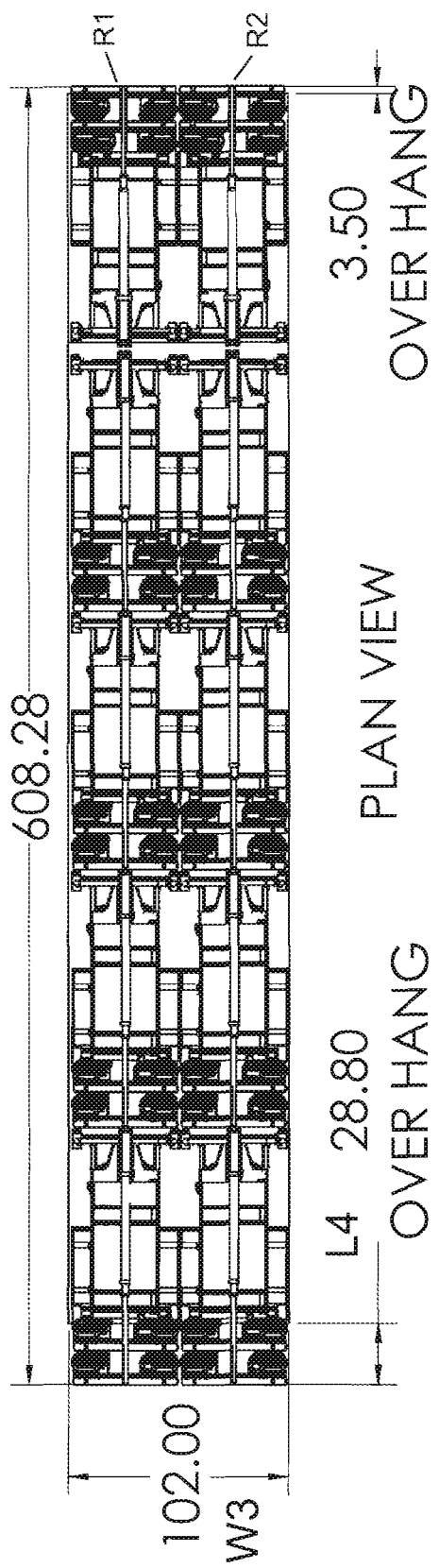
FIG. 15 is a top view thereof.
Figure 16:
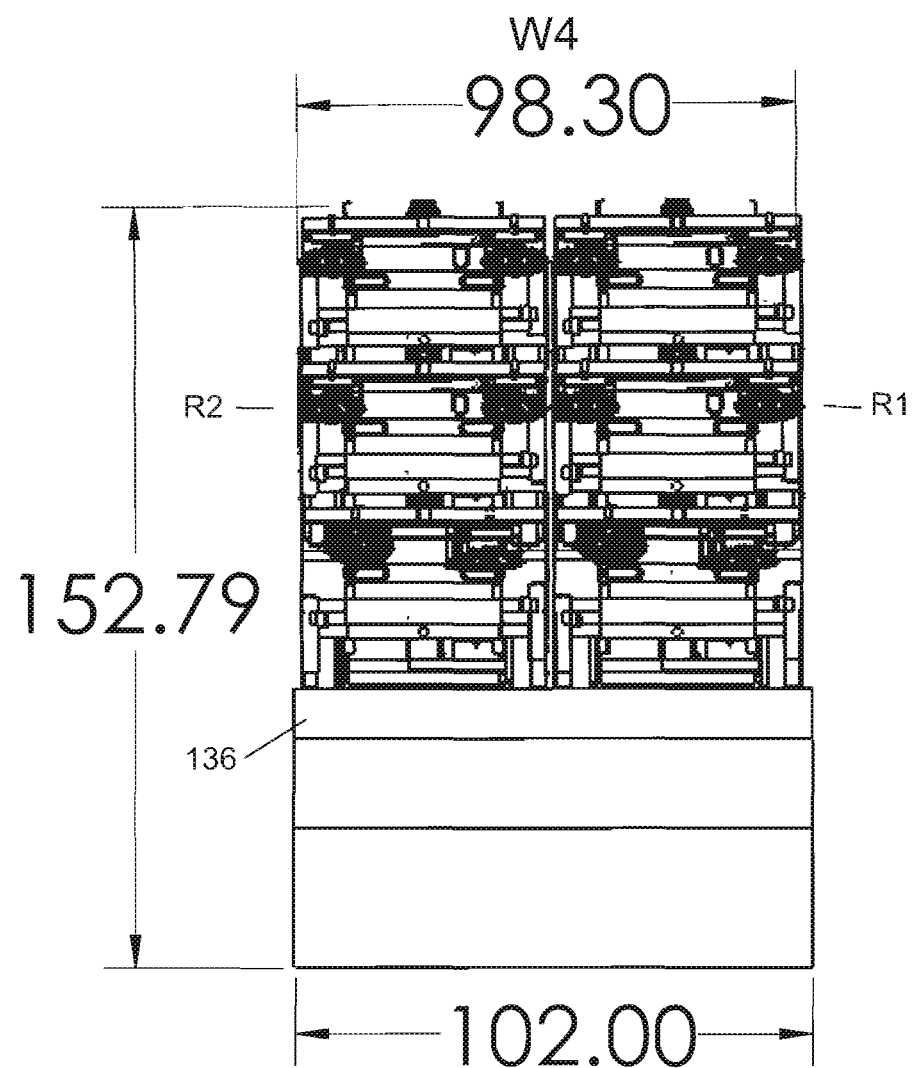
FIG. 16 is a front view thereof.

Referring now to FIGS. 9-12, illustrated are three enclosures with wheels 10, 10' and 10" shown in a stacked position. The height H2 of the three enclosures, when stacked, is about 97 inches, the width W1 remains the same at 48.5 inches, as does the length L of about 102 inches in a storage position. To achieve this dimension, the sidewalls 20 and 22 are constructed and arranged to engage the lower surface 112 of housing 12, illustrated in FIG. 5. For alignment purposes, the front left base 72 includes a support strut 110 that extends along a length of the left side of the lower surface 112, and front right base 82 includes support strut 114 extending along a length of the right side of the lower surface illustrated in FIG. 7. The support struts 110 and 114 are positioned outboard of the side walls 20, 22, securing a first enclosure 10 to a second enclosure 10', and the second enclosure 10' to a third enclosure 10". To assure the enclosures stay in alignment during shipping in a stacked arrangement, a middle alignment tab 120 and rear alignment tab 122 are secured to the lower surface 112. As depicted in FIG. 10, enclosure 10' has middle alignment tab 120' and rear alignment tab 122' secured to the lower surface 112 and positioned to be outboard of first sidewall 20 of enclosure 10. Similarly, enclosure 10" has middle alignment tab 120" and rear alignment tab 122" positioned to be outboard of sidewall 20' of enclosure 10'. The opposite side of the enclosure includes mirror image formed support strut 110, middle alignment tab 120, and rear alignment tab 122 positioned to be outboard of second sidewall 22, as best seen in FIG. 7; the support struts and alignment tabs securing an upper enclosure 10' to a lower enclosure 10.

It is noted that wheel 40' of a stacked enclosure 10' is arranged to be directly above wheel cover 32 of a lower enclosure 10 without touching the wheel cover 32. This allows prolonged storage without tire flat spotting, and further allows serviceability of the wheels and tires. The use of a rotating axle, as disclosed in the parent application and incorporated herein by reference, allows the wheel 40 on the lower enclosure 10 to pivot, wherein the support struts and alignment tabs can sit directly on a transport enclosure, or the ground. By pivoting the wheel 40 using the rotating axle, the tire no longer takes the weight of the enclosure, or the stacked enclosures. By removal of the weight, the tire will last longer and will not flat spot from non-movement. Further, the pivoting of the wheel 40 will lower the overall height of the enclosure 10 by about 12 inches. Alternatively, a removable straight or torsion axle may be employed.

FIGS. 13-16 illustrate a conventional drop deck trailer 130 having a length L2 of 48 ft. and a width W3 of 8.5 ft. Using the drop deck trailer 130 as an example, a total of thirty enclosures 10 can be configured for placement on the trailer 130. In a preferred configuration, three enclosures 10, 10' & 10" placed in a stacked arrangement with fifteen enclosures forming a left row R1 using the deck 132 and 134, and fifteen enclosures forming a right row R2 using decks 132 and 134. In this embodiment, the enclosures are facing rearward and the distal end 58 will extend over the front edge 136 of the deck 134 by about a length L3 of 3.5 inches. On the drop deck 132, the enclosures are facing forward and will extend over the rear edge 138 by a length L4 of about 28.8 inches. As previously stated, the width W1 of each enclosure 10 is 48.5 inches. When the enclosures are placed in a side by side configuration, the amount of space needed is 97 inches, leaving 5 inches for spacing, in light of the trailer 130 width W3 of 102 inches. With proper placement, the width W4 of the enclosures 10 in Row 1 and Row 2 is 98.3 inches. In the stacked position, the height H2 of the enclosures 10 above the drop deck 132 is 97.29 inches, wherein the height H3 of the enclosures 10 over the ground would be 134.79 inches, and the height H4 of the enclosures 10 stacked on the deck 134 over the ground would be 152.79 inches.

In another example, not illustrated, six enclosures with wheels and tow bars can be transported on a 10 ft. truck flat bed. In this arrangement, three enclosures are stacked and placed next to three additional enclosures. The arrangement allow use of a small flat bed and simple strapping for transportation.

Figure 17:
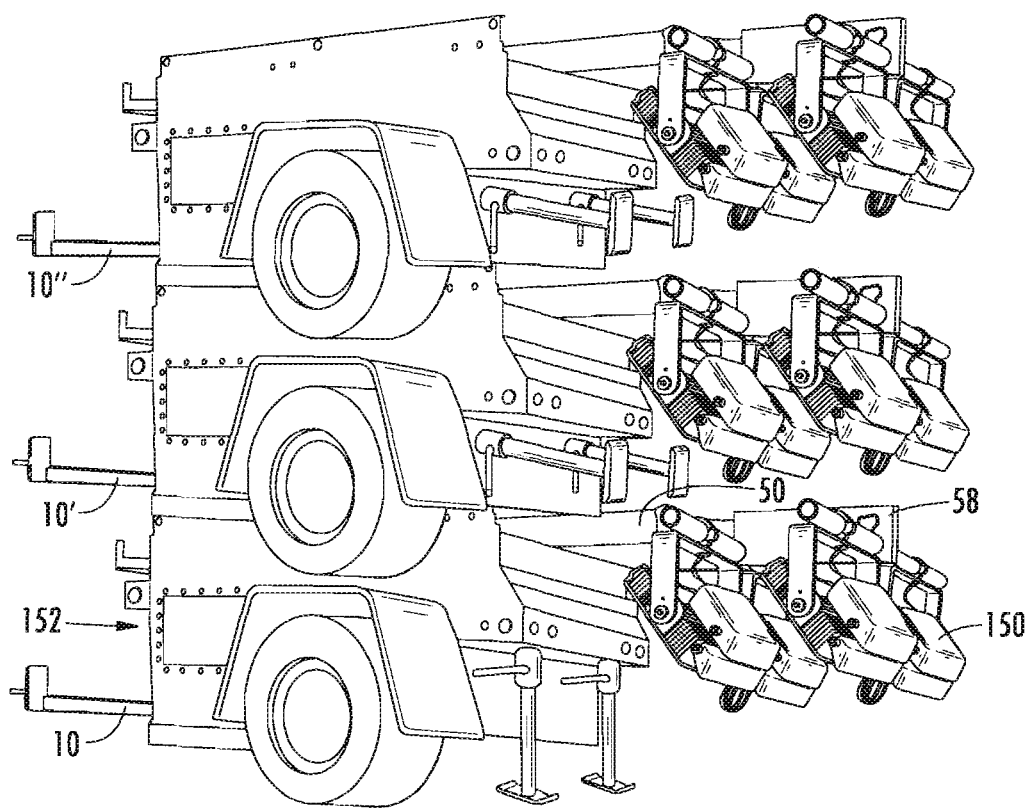
FIG. 17 is a perspective view of three enclosures with wheels and lighting in a stacked position.
Figure 18:
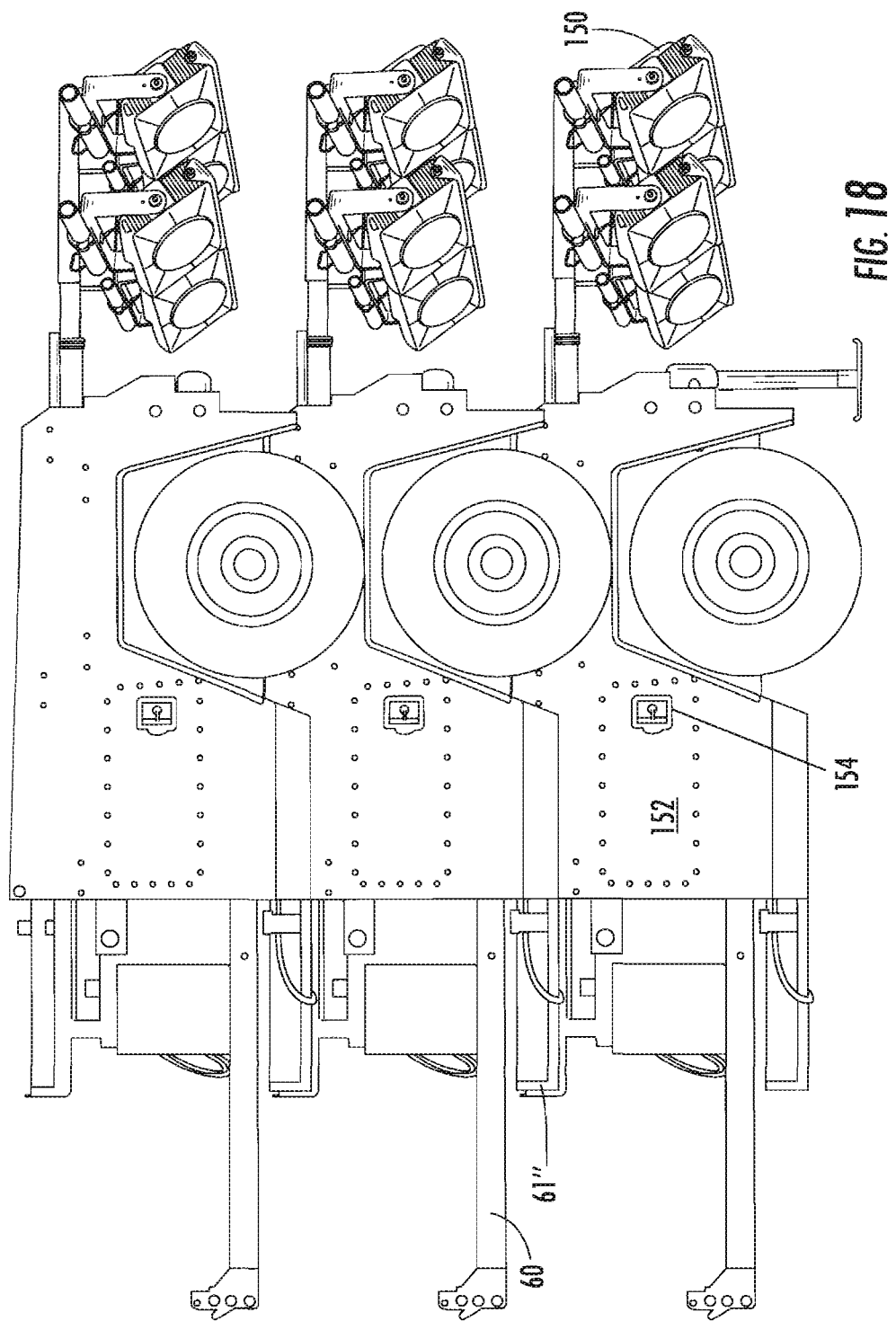
FIG. 18 is a side view of three stacked enclosures.

Referring to FIGS. 17-18, illustrated are three enclosures with wheels 10, 10' and 10" shown in a stacked position. A bank of lights 150 is placed along the distal end 58 of the mast 50 and can be raised to a height by actuation of the ram 51. For instance, the bank of lights might be used for road construction, mining, outdoor events, emergencies, or other low lighting situations where electricity is non-existent or unsatisfactory. The light bank may include halogen, metal halide fixtures, LED or any other flood light bank. The enclosure includes an access door 152 to allow maintenance checks of power system incorporating an engine. In this embodiment, the access door 152 can be opened while the lid 14 is closed to access the engine oil dipstick and other operational components, such as the on/off switch. The door 152 may be opened by handle 154, which may include an optional lock.

Figure 19:
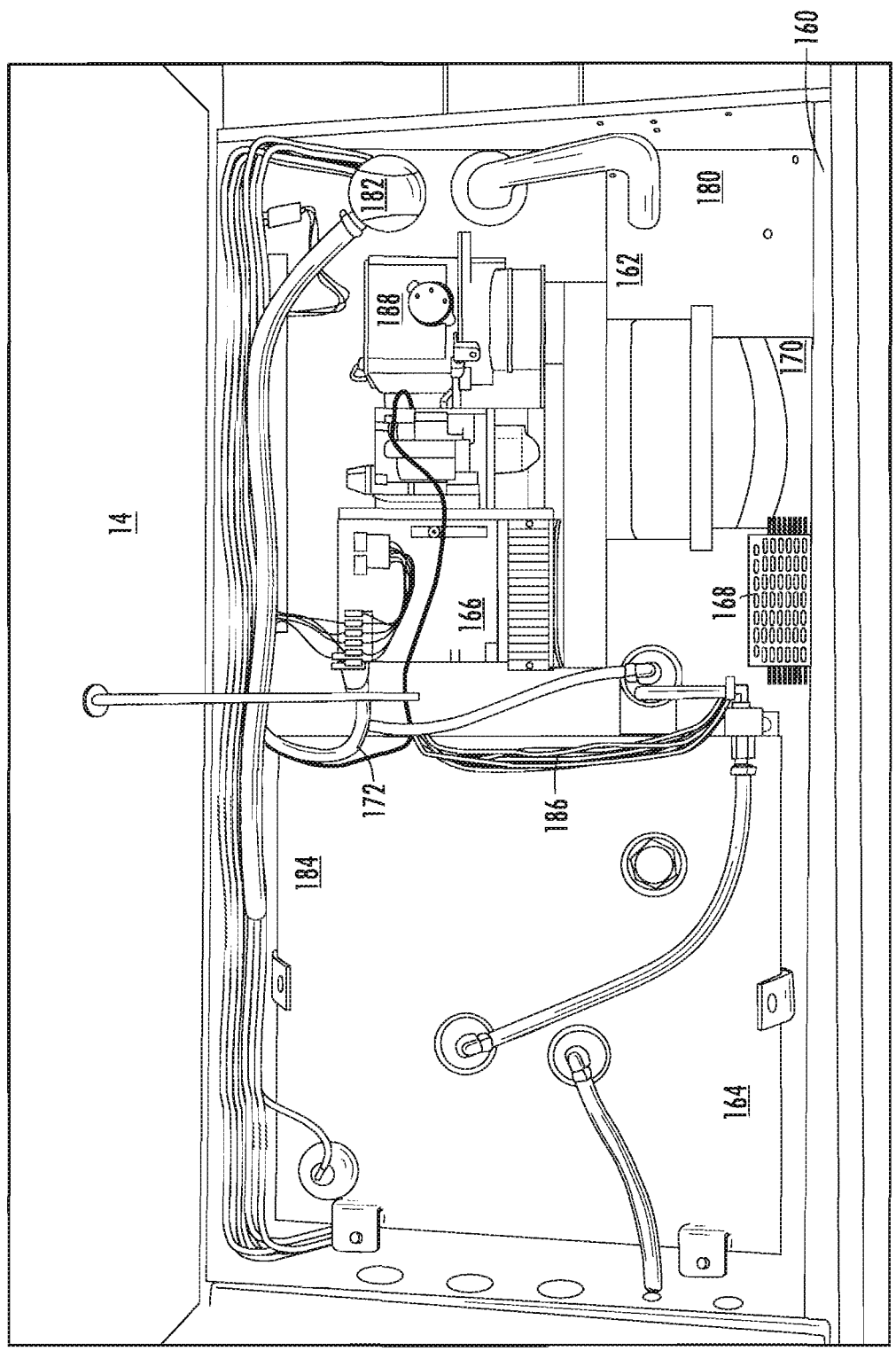
FIG. 19 is a perspective view of the interior of the enclosure.

FIG. 19 illustrates the enclosure interior chamber 160 when the lid 14 is in a raised position. The chamber holds the power system which consists of an internal combustion engine 162 that receives fuel from storage tank 164. The engine 162 is coupled to a generator 166 sized for powering the bank of lights chosen for the situational lighting requirement with a voltage conditioner 168. In a preferred embodiment, the power system is an internal combustion engine mounted to a generator without a bed plate. Elimination of the bed plate reduces weight and, more importantly, the footprint of the electrical generation system. Applicant's prior patents include lightweight and portable generator/engine assemblies that allow for the elimination of the base plate, which otherwise add hundreds of pounds to a conventional generator/engine assembly. U.S. Pat. Nos. 5,765,805 and 6,047,942 disclose lightweight generator/engine assemblies that provide a high electrical output with minimal size and weight; the contents of these patents are incorporated herein by reference. By use of lightweight generator/engine assemblies, both the weight and the size of the stackable enclosures can be reduced when used with lighting elements. Power can be supplied as AC or DC; preferably DC is used to power the bank of lights, and AC may be obtained for powering miscellaneous tools if needed. The engine 162 is electrically coupled to a starter battery 170. The lid can stay in the open position with positioning ram 172. Ventilation of the enclosure is performed by an exhaust fan 180 attached to a side wall of the enclosure. Also, ventilation fan 182 includes a vent pipe 184 to exhaust fumes that may accumulate over the fuel tank 164. When the lid 14 is in the raised position, the engine can be easily serviced and access to a fuel filter 186 and engine radiator fill port 188 are provided.

Figure 20:
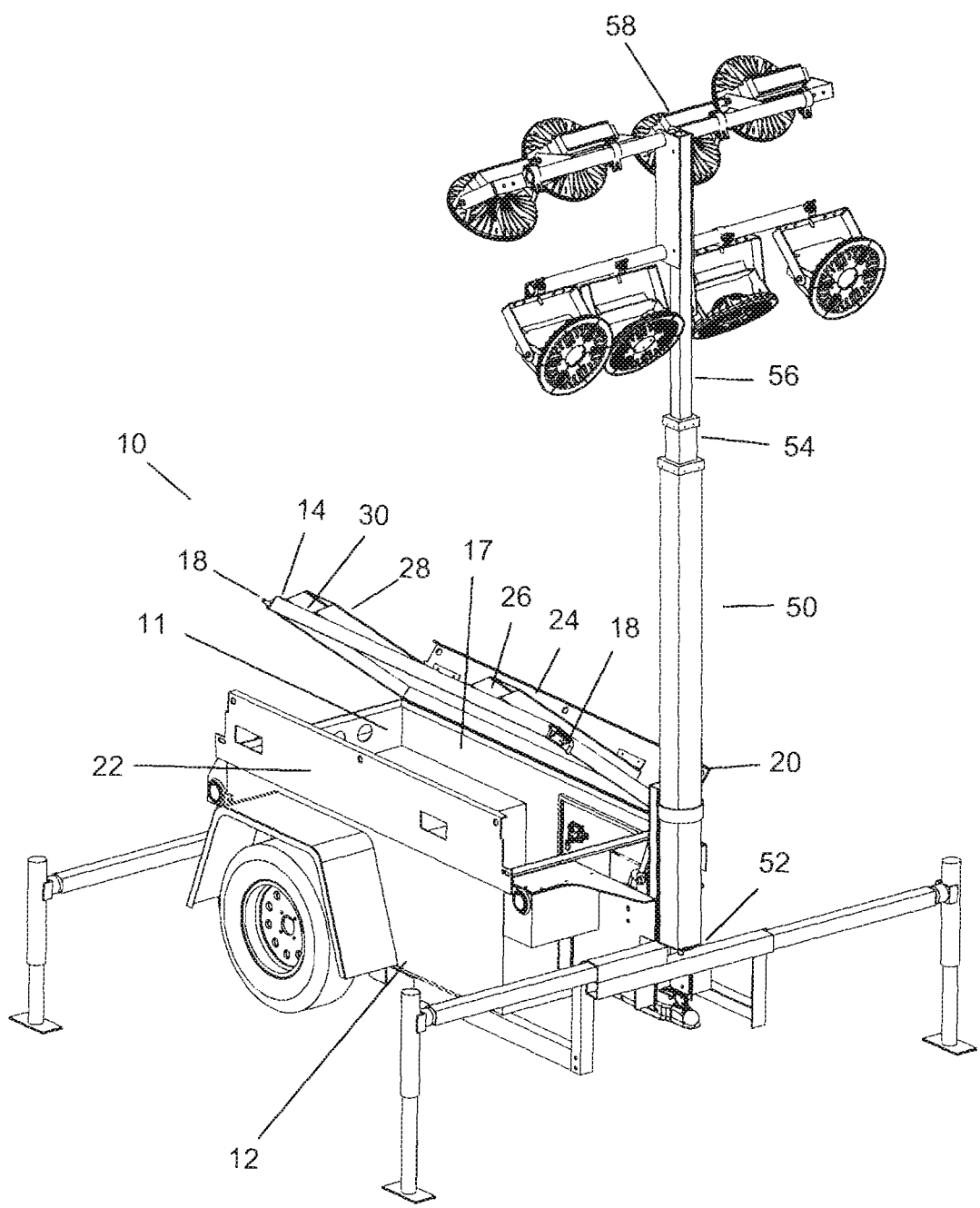
FIG. 20 is a perspective view illustrating deployed lights.

Referring to FIG. 20, illustrated is a stackable enclosure 10 having a housing 12 with lid 14 pivotally connected thereto held in a closed position by a latch 18. When unlatched, the lid 14 opens to reveal full and inhibited access to the interior 11 of the housing 12. The lid 14 includes a first sidewall 20 hinged to sidewall 17, and a second sidewall 22. A first fork arm channel 24 connects the first sidewall 20 and the second sidewall 22 with a through hole opening 26. A second fork arm channel 28 connects the first sidewall 20 and the second sidewall 22 with through hole opening 30.

The expandable mast 50, which is pivotally connected at a proximal end 52. The mast is extendable; either by hydraulics or a screw drive, with first and second extensions 54, 56 expanding the deployed length nearly three times the storage length. The distal end 58 of the mast 50 is used to secure lighting elements 150. Alternatively, speakers, cameras or the like items, not shown, can be attached to the distal end 58. When not in use, the trailer hitch 60 can be retracted into a storage position.

Referring to FIGS. 21 and 22, illustrated is the rotatable axle configuration 300 which permits the raising and lowering of the wheels. In this embodiment, a circular torsion bar 310 extends between the frame of the enclosure and is secured to the enclosure by bushings 312 and 314. The torsion bar is preferably constructed from spring steel, having a left arm 316 secured to the first end 318 of the torsion bar 310. The left arm 316 includes an axle stub 320 extending at a 90 degree angle from the left arm 316 and available for securement of a wheel hub and wheel, not shown. Similarly, a right arm 322 is attached to the second end 324 of the torsion bar 310, forming a mirror image of the left arm 316. The right arm 322 includes an axle stub 326 extending from the right arm 322 and available for securement of a wheel hub and wheel, not shown. A positioning bar 330 is attached to the torsion bar 310 and is used to secure the torsion bar in a lowered position, as depicted in FIG. 20, wherein the enclosure can be moved in a conventional manner. As depicted in FIG. 21, the torsion bar 310 can be rotated, wherein axle stubs 320 and 326 are in a raised position and the positioning bar 320 placed in a securement position. The torsion bar 310 can be fixed in the raised or lowered position by use of a locking pin 332, such as but not limited to a locking pin placed through the positioning bar aperture 321 for attachment to a frame boss 334. The torsion bar 310 is able to rotate within the bushings 312 and 314 from the lowered position, wherein the frame of the enclosure is movable to a raised position, wherein the frame of the enclosure can be either placed and stacked on the ground or stacked upon another enclosure. In place of a locking pin 332, a key lock can be inserted into the aperture 321 as an anti-theft provision. Hubs and wheels are securable to the stub axles 320 and 326, not shown for clarity. The length of the left and right arm 316 and 322 is dependent upon the size of the wheel/tire combination that is to be rotated. The objective of the rotation is to position the axle at a distance that will allow the frame to rest on the ground, or on an adjoining frame.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used herein, the terms "comprising," "comprise" or "comprised," and variations thereof, in reference to defined or described elements of an item, composition, apparatus, method, process, system, etc. are meant to be inclusive or open ended, permitting additional elements, thereby indicating that the defined or described item, composition, apparatus, method, process, system, etc. includes those specified elements—or, as appropriate, equivalents thereof—and that other elements can be included and still fall within the scope/definition of the defined item, composition, apparatus, method, process, system, etc.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A stackable enclosure comprising:
a housing formed from a bottom surface with a first lower side wall, a second lower side wall, a first end wall and a second end wall with a lid having an upper surface formed from a first side wall hingedly attached to other of said lower side walls and a second side wall that is releasably securable to one of said lower side walls;
a first fork arm channel positioned between said first side wall and said second side wall with a first through hole opening therebetween, a second fork arm channel positioned between said first side wall and said second side wall with a second through hole opening therebetween;
a mast hingedly secured to said housing and rotatable from a lowered position, placing said mast in a horizontal position, and a raised position, placing said mast in a vertical position, said mast having a telescoping distal end;
wherein said first and second fork arm channels are sized for receipt of fork lift points for ease of lifting said enclosure, whereby said first and second lower side walls of said enclosure is constructed and arranged to align with a similar shaped enclosure having a lid with first and second side walls to allow vertical stacking of like enclosures.

2. The stackable enclosure according to claim 1 including an axle secured to said bottom surface of said housing, said axle having a wheel rotatably secured to each end of said axle; and a tow bar having a tongue hitch slidably secured to a receptacle attached to said housing, said tow bar positioned within said receptacle for storage and extended outward from said receptacle for securement of said tongue hitch to a towing vehicle.

3. The stackable enclosure according to claim 2 wherein said axle is pivotable from a first position beneath said bottom surface to a second position above said bottom surface.

4. The stackable enclosure according to claim 1 including an outrigger attached to said enclosure, said outrigger having a base attached to said enclosure sized for slidable receipt of an extension tube with an adjustable leg rotatably attached to a distal end of said extension tube; wherein said leg is positioned a distance from said enclosure by movement of said extension tube and said leg is adjustable in height.

5. The stackable enclosure according to claim 1 including a plurality of lights secured to said distal end of said mast.

6. The stackable enclosure according to claim 1 including a power system having an electrical generator coupled to an internal combustion engine in the housing.

7. The stackable enclosure according to claim 1 wherein one said side wall includes an access panel constructed and arranged to access to said housing.

8. The stackable enclosure according to claim 1 wherein said first and second fork arm channels having an outer surface to support said mast when said mast placed in a horizontal storage position.

9. The stackable enclosure according to claim 1 wherein said mast is pivoted from a horizontal storage position to a vertical deployed position by a ram cylinder.

10. The stackable enclosure according to claim 1 wherein said bottom surface of said enclosure includes alignment tabs arranged for placement on an outboard edge of the side walls on an adjoining enclosure.

11. A stackable enclosure comprising:
a housing formed from a bottom surface with a first lower side wall, a second lower side wall, a first end wall and a second end wall with a lid having an upper surface formed from a first side wall hingedly attached to one of said lower side walls and a second side wall that is releasably securable to one of said lower side walls;
a first fork arm channel positioned between said first side wall and said second side wall with a first through hole opening therebetween, a second fork arm channel positioned between said first side wall and said second side wall with a second through hole opening therebetween;
a tow bar having a tongue hitch slidably secured to receptacle attached to said housing, said tow bar positioned within said receptacle for storage and extended outward from said receptacle for securement of said tongue hitch to a towing vehicle;
an axle secured to said bottom surface of said housing, said axle having a wheel rotatably secured to each end of said axle;
a mast hingedly secured to said housing and rotatable from a lowered position, placing said mast in a horizontal position, and a raised position, placing said mast in a vertical position, said mast having a telescoping distal end;
a plurality of lights secured to said distal end of said mast; and
a power system positioned within said housing electrically coupled to said lights;
wherein said first and second fork arm channels are sized for receipt of fork lift points for ease of lifting said housing, whereby said first and second lower side walls of said housing is constructed and arranged to align with a similar shaped housing having a lid with first and second side walls to allow vertical stacking of like housings.

12. The stackable enclosure according to claim 11 wherein said axle is pivotable from a first position beneath said bottom surface to a second position above said bottom surface.

13. The stackable enclosure according to claim 11 wherein a height of said housing and wheels is less than about 39 inches.

14. The stackable enclosure according to claim 11 wherein a height of three housings placed on top of each other in a stacked format is less than about 98 inches.

15. The stackable enclosure according to claim 11 wherein a length of said housing is less than 120 inches.

16. The stackable enclosure according to claim 11 wherein a width of said housing and wheels is less than about 48.50 inches.

17. The stackable enclosure according to claim 11 including an outrigger attached to said housing, said outrigger having a base attached to said housing sized for slidable receipt of an extension tube with an adjustable leg rotatably attached to a distal end of said extension tube; wherein said leg is positioned a distance from said housing by movement of said extension tube and said leg is adjustable in height.

18. The stackable enclosure according to claim 17 wherein two outriggers extend out of said first lower side wall and two outriggers extend out of said second lower side wall.

19. The stackable enclosure according to claim 11 wherein said power system is an electrical generator coupled to an internal combustion engine electrically coupled to said lights.

20. The stackable enclosure according to claim 19 wherein said electrical generator is directly mounted to said internal combustion engine without a base plate.

21. The stackable enclosure according to claim 11 wherein one said side wall includes an access panel constructed and arranged to permit servicing for said power system within said housing.

22. The stackable enclosure according to claim 11 wherein said first and second fork arm channels having an outer surface to support said mast when placed in a horizontal storage position.

23. The stackable enclosure according to claim 11 wherein said mast is pivoted from a horizontal storage position to a vertical deployed position by a ram cylinder.

24. The stackable enclosure according to claim 11 wherein said bottom surface of said housing includes alignment tabs arranged for placement on an outboard edge of the side walls on an adjoining housing.

25. The stackable enclosure according to claim 11 wherein a fuel tank is strategically positioned over said axle; wherein tongue weight for a trailer is not changed with a change in fuel level.

* * * * *